United States Patent Office 3,773,948
Patented Nov. 20, 1973

3,773,948
AMMINE COMPLEX OF PALLADIUM NITRATE AND METHOD OF PREPARATION
James H. Tsai, Sarnia, Ontario, Canada, and Ludo K. Frevel, Midland, Mich., assignors to The Dow Chemical Company, Midland, Mich.
No Drawing. Filed Aug. 26, 1970, Ser. No. 67,227
Int. Cl. C01b 21/00; C01g 55/00
U.S. Cl. 423—387
9 Claims

ABSTRACT OF THE DISCLOSURE

An ammine complex of palladium nitrate is prepared by dissolving palladium in nitric acid and neutralizing with ammonia until an orange color in the solution is formed. The novel complex has the structure $$[Pd(NH_3)_3NO_2]_2[Pd(NH_3)_4](NO_3)_4$$

It can be used to prepare a highly reactive palladium-containing catalyst or to prepare $Pd(NH_3)_4(NO_3)_2$ which is useful as a palladium plating compound.

BACKGROUND OF THE INVENTION

Palladium, particularly when finely divided on a support, is known to be an excellent catalyst for hydrogenation of carbon-to-carbon unsaturation. Water-soluble bivalent palladium salts slowly hydrolyze to form insoluble hydroxides which makes uniform deposition of palladium on a support very difficult. In addition if palladium halide complexes are used, it is extremely difficult to remove the last traces of halide, which is a catalyst poison. The ammine complex of this invention is stable in aqueous solutions, especially ammoniacal solutions, for long periods of time. They can be employed to make superior catalysts.

SUMMARY OF THE INVENTION

It has been found that novel, water-soluble, complex palladium ammine compounds are free of elements which are palladium catalyst poisons.

The complexes are formed by reacting palladium metal in aqueous nitric acid solution and adding sufficient ammonia or aqueous ammonium hydroxide to the aqueous nitric acid solution of palladium to form an orange color in the solution.

The product thus formed has the structural formula $$[Pd(NH_3)_3(NO_2)]_2[Pd(NH_3)_4](NO_3)_4$$

One of the objects of this invention is the provision of a novel ammine complex of palladium nitrate.

Another object is the provision of an ammine complex of palladium having the above defined formula.

Another object is the provision of an ammine complex of palladium which is very soluble in water and in dimethylsulfoxide.

Another object is the method of preparing the said ammine complex from metallic palladium.

Another object is the preparation of a superior palladium-containing catalyst from said ammine complex.

The novel ammine complex of palladium nitrate and nitrate is prepared by dissolving metallic palladium in nitric acid and neutralizing with ammonia or ammonium hydroxide until an orange color is imparted to the solution.

Addition of a water soluble alkanol to either the initial solution after concentration or to the filtrate will affect precipitation of the novel palladium complex. Concentration can be effected by heating up to boiling temperature in an inert gaseous atmosphere, which can be any of the noble gases or nitrogen.

The catalysts can be prepared by roasting the ammine-containing palladium complex, in air, with or without a catalyst support, and activating the catalyst by reduction with hydrogen. Catalysts made with the novel palladium complex of this invention are extremely active and require no treatment to remove halogen-containing materials. The latter are known to be extremely potent palladium catalyst poisons and the absence of any halogen in the system may contribute to the high catalytic activity.

DETAILED DESCRIPTION OF THE INVENTION

The example which follows is intended to illustrate but not to limit the invention. All parts are by weight unless otherwise specified.

A mixture of 0.4 mole 55% aqueous nitric acid and 0.12 mole of powdered palladium was stirred for about 1.5 hours at room temperature. A 15% aqueous ammonia solution was added dropwise to the brown solution until the color changed to orange. This required about 80 ml. of the aqueous ammonia. The solution was heated on a steam bath for about ½ hour and then unreacted palladium (0.016 mole) was removed by filtration. Other known means of separating liquid from solids, such as centrifuging or decanting can be employed. The filtrate was evaporated in an inert atmosphere, in this case under $N_2$, to about ½ its original volume while heating, and again filtered hot. On cooling the filtrate to 0–5° C., 14 g. of yellowish-orange colored, plate-like crystals of $[Pd(NH_3)_3(NO_2)]_2[Pd(NH_3)_4](NO_3)_4$ were obtained.

Two additional evaporations and crystallizations of the filtrate provided crops of 8.5 g. and 2.5 g. of the complex. To the filtrate from the last crystallization 20–30 ml. of methanol were added. A fourth crop of 1.5 g. of crystalline complex were obtained. The methanol-water filtrate was evaporated by flowing air at room temperature. The precipitate yielded about 3 g. of additional palladium complex. The last three crops of crystals (7 g.) were combined and dissolved in about 6 ml. hot water, filtered while hot, and then cooled to ice water temperature. The fine yellow crystals were washed with several 5 ml. portions of methanol and air dried. The total yield of the palladium complex of this invention was 28.0 g. of pure crystalline product. This is a 96% yield based on the metal consumed. Water soluble alkanols, preferably those of 1–3 C atoms can be added to the original concentrate or any of the concentrated filtrates to effect a greater amount of precipitation from the aqueous solution of the palladium complex. The most preferred alkanol is methanol and the preferred alkanol concentration is about 40 to about 80% by weight of the total liquids. A three-dimensional X-ray diffraction analysis of the crystalline product, which refined to a reliability index of $R_F=.037$, showed that the palladium (II) ammine complex crystallized in space group $1\bar{4}2$ m., with unit cell dimensions of $a=7.637$ A., $c=21.629$ A. and has two "molecules" per unit cell. Both types of the Pd in the crystal show square planar coordination and the packing of nitrotriammine Pd, tetrammine Pd and nitrate ions precluded metal-metal interactions. The crystals had three unique Pd—$NH_3$ distances of 2.044 A., 2.034 A. and 2.053 A. The Pd—$NO_2$ distance was 1.984 A., the N—O distances are 1.230 and 1.238 A. in $NO_3$ and 1.104 A. in the $NO_2$ group. Only one weak hydrogen bonding similar to $NH_4NO_3$ was observed. Listed below in Table I are the final atomic parameters, as determined from the X-ray data and in Table II are listed the bond distances and angles for the compound.

TABLE I.—FINAL ATOMIC PARAMETERS [a][b]

| Atom | Wyckoff set | x | y | z | $\beta_{11}$ | $\beta_{22}$ | $\beta_{33}$ | $\beta_{12}$ | $\beta_{13}$ | $\beta_{23}$ |
|---|---|---|---|---|---|---|---|---|---|---|
| Pd(1) | 2a | 0 | 0 | 0 | 1,282(9) | $\beta_{11}$ | 87(1) | 0 | 0 | 0 |
| Pd(2) | 4e | 0 | 0 | 0.25959(2) | 957(7) | $\beta_{11}$ | 115(1) | 0 | 0 | 0 |
| N(1) | 8i | 0.1892(6) | x | 0.0007(5) | 1,711(64) | $\beta_{11}$ | 187(11) | −311(91) | −123(63) | $\beta_{13}$ |
| N(2) | 8i | 0.1883(7) | x | 0.2601(4) | 1,418(76) | $\beta_{11}$ | 258(19) | −468(104) | 0(26) | $\beta_{13}$ |
| N(3) | 4e | 0 | 0 | 0.3546(4) | 2,542(136) | $\beta_{11}$ | 109(12) | 0 | 0 | 0 |
| N(4) | 4e | 0 | 0 | 0.1678(4) | 2,323(125) | $\beta_{11}$ | 125(14) | 0 | 0 | 0 |
| N(5) | 8h | 0.5 | 0 | 0.1217(2) | 1,661(112) | 1,585(107) | 160(10) | 0 | 0 | 0 |
| O(1) | 8i | 0.0863(12) | x | 0.1404(3) | 9,920(508) | $\beta_{11}$ | 157(13) | −6,172(579) | 182(50) | $\beta_{13}$ |
| O(2) | 8h | 0.5 | 0 | 0.1790(3) | 3,299(187) | 3,400(196) | 161(9) | 0 | 0 | 0 |
| O(3) | 16j | 0.5125(20) | 0.1379(7) | 0.0927(2) | 2,615(148) | 2,244(94) | 373(13) | 297(214) | −103(52) | 345(32) |

[a] Standard errors are given in parentheses.
[b] The anisotropic temperature factors, given in the form $\exp[-(\beta_{11}h^2+\beta_{22}k^2+\beta_{33}l^2+2\beta_{12}hk+2\beta_{13}hl+2\beta_{23}kl)]$ are multiplied by $10^5$.

TABLE II.—BOND DISTANCES AND ANGLES [a][b]

A Distances (A.):
| | | | |
|---|---|---|---|
| Pd(1)-N(1) | 2.044(3) | N(4)-O(1) | 1.104(7) |
| Pd(2)-N(2) | 2.034(4) | N(5)-O(2) | 1.238(6) |
| Pd(2)-N(3) | 2.053(8) | N(5)-O(3) | 1.230(6) |
| Pd(2)-N(4) | 1.984(8) | | |

B Angles (deg.):
| | | | |
|---|---|---|---|
| N(1)-Pd(1)-N(1)' | 179.2(6) | Pd(2)-N(4)-O(1) | 122.4(5) |
| N(1)-Pd(1)-N(1)'' | 89.6(3) | O(1)-N(4)-O(1)' | 115.2(9) |
| N(2)-Pd(2)-N(2)' | 179.4(4) | O(1)-Pd(1)-O(1)' | 34.2(2) |
| N(2)-Pd(2)-N(3) | 89.7(2) | O(2)-N(5)-O(3) | 120.7(3) |
| N(2)-Pd(2)-N(4) | 90.32(2) | O(3)-N(5)-O(3)' | 118.6(6) |

[a] Primed atoms are related by diads; double primed by $\bar{4}$ axes.
[b] Standard errors were computed from the variance-covariance matrix obtained in the final least-squares cycle.

On analysis the palladium complex was found to contain 38.2% Pd, 26.2% N, 3.5% H, 31.7% O (20.0% $NH_3$, 8.5% $NO_2$ and 35.0% $NO_3$).

The crystals melt at 210° C. with effervescence and turn black at 230° C.

The palladium complex of this invention is soluble in a variety of solvents. Solubility data below are based on grams of the complex which dissolve in 100 ml. of the solvent: 43.0 in water, 48.5 in dimethyl sulfoxide, 4.25 in dimethyl formamide and 0.34 in methanol. It is substantially insoluble in tetrahydrofuran. The complex is relatively stable in aqueous solution but very stable in ammonia solution. On standing in distilled water some $[Pd(NH_3)]_4(NO_3)_2$ and some trans-$[Pd(NH_3)_2(NO_2)_2]$ are formed. Saturated aqueous solutions disproportionate more rapidly than dilute solutions. On addition of KI to the aqueous solution of

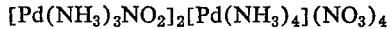
$[Pd(NH_3)_3NO_2]_2[Pd(NH_3)_4](NO_3)_4$ ammonia is liberated and an orange precipitate is formed.

A catalyst was prepared by impregnating 20 g. of 6–8 mesh diatomaceous earth with 20 ml. of an aqueous solution containing .074 mg. $AgNO_3$ and 110 mg. of

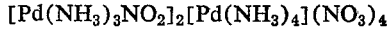
$[Pd(NH_3)_3NO_2]_2[Pd(NH_3)_4](NO_3)_4$

The moist catalyst was then dried for 1 hour at 120° C. and thereafter roasted at 320° C. for 1½ hours. 6.55 g. of the roasted catalyst were placed into a test reactor and reduced with a mixture of 5% $H_2$ and 95% $N_2$ at 100° C. for one hour. Thereafter a mixture of 1% acetylene and 1.5% $H_2$ in ethylene was fed into the reactor at varying rates up to 1200 ml. per minute. The space velocity was approximately 3600 v./v./hr. Over a period of 41 hours, the effluent stream contained less than 1 p.p.m. acetylene. The flow of $H_2$ and ethylene-acetylene mixture was stopped and the catalyst was heated at 550° C. in an air nitrogen mixture having an $O_2$ content less than 10%. The catalyst was reduced in the manner above described and again tested for its selectivity in hydrogenating acetylene in an ethylene stream. The acetylene removal was complete after two days of operation.

We claim:

1. Crystalline Pd II nitroammine complex

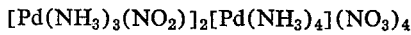
$[Pd(NH_3)_3(NO_2)]_2[Pd(NH_3)_4](NO_3)_4$ crystallized in space group 142 m., having unit cell dimensions of $a=7.637$ A. and $c=21.629$ A. in which both Pd atoms in the crystal show square planar coordination and the packing of nitrotriammine Pd, tetraamine Pd and nitrate ions preclude metal-metal interaction, and in which three P—$NH_3$ distances are 2.044 A., 2.034 A. and 2.053 A., the Pd—$NO_2$ distance is 1.984 A., the N—O distances are 1.230 and 1.238 A. in $NO_3$ and 1.104 A. in the $NO_2$ groups.

2. The compound of claim 1 in solution in aqueous ammonia.

3. A method of preparing a Pd II nitroammine complex of the formula $[Pd(NH_3)_3(NO_2)]_2[Pd(NH_3)_4](NO_3)_4$, as further defined in claim 1, comprising dissolving metallic palladium in aqueous nitric acid and adding ammonia or ammonium hydroxide solution in a quantity sufficient to effect an orange color in the solution containing the palladium-nitric acid reaction product mixture and separating any unreacted palladium from the mixture.

4. The method of claim 3 in which the palladium-nitric acid reaction product mixture, after addition of ammonia or ammonium hydroxide, is concentrated under a blanket of inert gas and recovering crystalline

$[Pd(NH_3)_3NO_2]_2[Pd(NH_3)_4](NO_3)_4.$

5. The method of claim 3 in which a water-soluble alkanol is added to a concentrated aqueous solution of the $[Pd(NH_3)_3NO_2]_2[Pd(NH_3)_4](NO_3)_4$ to effect precipitation thereof and thereafter recovering the precipitate.

6. The method of claim 5 in which the alkanol has 1–3 C atoms.

7. The method of claim 6 in which the alkanol is methanol.

8. The method of claim 6 in which the alkanol is ethanol.

9. The method of claim 4 in which the ammoniated mixture is cooled to about 0° C. to effect crystallization of the $[Pd(NH_3)_3NO_2]_2[Pd(NH_3)_4](NO_3)_4$.

References Cited

UNITED STATES PATENTS

| | | | |
|---|---|---|---|
| 2,452,308 | 10/1948 | Lambros | 204—47 |
| 3,530,050 | 9/1970 | Hill et al. | 204—47 |

OTHER REFERENCES

Mellor: "Comprehensive Treatise on Inorganic and Theoretical Chemistry," vol. 15, pp. 684–685 (1936).

Ephraim: "Inorganic Chemistry," 5th English edition, 1948, pp. 343–350.

MILTON WEISSMAN, Primary Examiner

U.S. Cl. X.R.

204—47; 252—460